(12) United States Patent
Tsai et al.

(10) Patent No.: US 9,004,737 B2
(45) Date of Patent: Apr. 14, 2015

(54) ILLUMINATION APPARATUS

(71) Applicant: Global Lighting Technologies Inc., Taoyuan (TW)

(72) Inventors: Chung-Lin Tsai, Taoyuan (TW); Guo-Chen Lee, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 56 days.

(21) Appl. No.: 13/911,102

(22) Filed: Jun. 6, 2013

(65) Prior Publication Data

US 2013/0265754 A1    Oct. 10, 2013

Related U.S. Application Data

(63) Continuation-in-part of application No. 13/172,882, filed on Jun. 30, 2011, now Pat. No. 8,480,286, which is a continuation-in-part of application No. 12/464,104, filed on May 12, 2009, now Pat. No. 7,997,784.

(51) Int. Cl.
*F21V 7/04* (2006.01)
*F21V 8/00* (2006.01)

(52) U.S. Cl.
CPC ............ *G02B 6/0083* (2013.01); *G02B 6/0068* (2013.01); *G02B 6/0085* (2013.01); *G02B 6/0021* (2013.01); *G02B 6/0073* (2013.01)

(58) Field of Classification Search
None
See application file for complete search history.

(56) References Cited

U.S. PATENT DOCUMENTS

| | | | |
|---|---|---|---|
| 4,613,644 A | 9/1986 | Moritani et al. | |
| 7,997,784 B2 | 8/2011 | Tsai | |
| 8,243,044 B2 * | 8/2012 | Mackey et al. | 345/174 |
| 8,419,261 B2 | 4/2013 | Tsai | |
| 8,419,262 B2 | 4/2013 | Tsai et al. | |
| 2005/0052860 A1 | 3/2005 | Tsai | |
| 2006/0050532 A1 | 3/2006 | Stadtwald-Klenke | |
| 2006/0104091 A1 | 5/2006 | Chen et al. | |
| 2009/0129115 A1 | 5/2009 | Fine et al. | |
| 2011/0280046 A1 | 11/2011 | Tsai et al. | |
| 2012/0163025 A1 | 6/2012 | Tsai et al. | |
| 2012/0163029 A1 | 6/2012 | Tsai | |
| 2012/0170313 A1 | 7/2012 | Tsai et al. | |
| 2012/0170317 A1 | 7/2012 | Tsai et al. | |
| 2012/0170318 A1 | 7/2012 | Tsai et al. | |

FOREIGN PATENT DOCUMENTS

| | | | | |
|---|---|---|---|---|
| JP | 2006066236 A | * | 3/2006 | ............ F21V 8/00 |
| KR | 20020076687 | * | 10/2002 | ......... G02F 1/13357 |

* cited by examiner

*Primary Examiner* — Donald Raleigh
(74) *Attorney, Agent, or Firm* — Jianq Chyun IP Office

(57) ABSTRACT

An illumination apparatus including an illumination shell, a circuit and a light source is provided. The illumination shell is formed by a light guide plate. The circuit has a plurality of circuit contacts integrated with the illumination shell. The light source is disposed on the illumination shell and electrically contacted to the plurality of circuit contacts.

16 Claims, 5 Drawing Sheets

ILLUMINATION APPARATUS

CROSS-REFERENCE TO RELATED APPLICATION

This application is a continuation-in-part of and claims the priority benefit of U.S. application Ser. No. 13/172,882, filed on Jun. 30, 2011, now allowed, which is a continuation-in-part of and claims the priority benefit of U.S. application Ser. No. 12/464,104, filed on May 12, 2009, now U.S. Pat. No. 7,997,784. The entirety of each of the above-mentioned patent applications is hereby incorporated by reference herein and made a part of this specification.

BACKGROUND OF THE INVENTION

1. Field of the Invention

The present invention relates to an illumination apparatus including a circuit and a light source.

2. The Prior Arts

A light-emitting diode (LED) is a semiconductor element, and the material for forming a light-emitting chip of an LED mainly includes chemical elements selected from groups III-V, such as gallium phosphide (GaP), gallium arsenide (GaAs), and other compound semiconductors. The light-emitting principle is converting electric energy into light, namely applying electric current to a compound semiconductor, so that redundant energy is released in the form of light through the combination of electrons and electron holes, thereby achieving light-emitting effects.

Since the light-emitting phenomenon of LED is not caused by heating or discharging, the lifespan of LED is more than 100,000 hours, and idling time is saved. Moreover, LED has the advantages of quick response speed (about 10-9 seconds), compact size, low power consumption, low pollution, high reliability, capability for mass production, etc. Owing to the characteristics of long life span and low power consumption, the application of LED is fairly extensive, for example, mega-size outdoor display boards, traffic lights, cell phones, light sources of scanners, illumination devices, and so forth.

However, the conventional illumination apparatus is generally configured by providing LEDs onto a circuit board, and the LEDs are electrically connected with the circuit board, so as to form an LED array, and then assembling the LED array into a light source accommodating space of the illumination apparatus. Accordingly, in fabricating such an illumination apparatus, the LEDs must be previously welded to the circuit board. Then, the circuit board, together with the LEDs welded thereon, is secured to light source accommodating space of the illumination apparatus. As such, the process of the fabrication is relatively complex, and needs a high fabrication cost.

SUMMARY OF THE INVENTION

An aspect of the disclosure is to provide a solution to the problem of the conventional illumination apparatus, in which the fabrication process of providing the LEDs serving as light sources to the illumination apparatus is complex and expensive.

One embodiment of the disclosure provides an illumination apparatus including an illumination shell, a circuit and a light source. The illumination shell is formed by a light guide plate. The circuit has a plurality of circuit contacts integrated with the illumination shell. The light source is disposed on the illumination shell and electrically connected to the plurality of circuit contacts.

According to an embodiment of the disclosure, the illumination apparatus further includes a hard coating layer disposed to cover the circuit. In detail, the hard coating layer can be achieved by light cure adhesive or UV insulation ink. Meanwhile, the material of the circuit can be selected to be a light-transmitting material, such as the Indium Tin Oxide.

Considering about the realization of an embodiment of the disclosure, the light source includes at least one light-emitting diode (LED), and the LEDs includes many pins for being electrically connected to the circuit contacts. Correspondingly, the illumination shell can be designed to have a recessed compartment for receiving the light source, such as a recess or a hole. The circuit contacts are designed to be extended and arranged on the inner surface of the recessed compartment.

According to an embodiment of the disclosure, the illumination apparatus further includes a decoration pattern on the surface of the illumination shell, and the circuit is arranged on and overlapped with the decoration pattern. Specifically, the decoration pattern can be designed to be a colored decoration pattern.

Correspondingly, the light source in one embodiment includes many lighting elements with different colors, and the lighting elements with different colors can be arranged to match the colored decoration pattern.

Taking the shape of the light guide plate forming the illumination shell in to consideration, the illumination shell can be designed to many shapes, such as a ball, a wave-type plate, an ice cream or even a flexible thin film. The circuit can be arranged on the outer surface of the illumination shell, and thus the light source of the illumination apparatus can be designed freely after the illumination shell is made.

According to an embodiment of the disclosure, the illumination shell is in disc shape, and is adapted to be connected to a fixture. For instance, the disc shape illumination shell such as a ceiling round light can be hanged on the ceiling via several nylon ropes due to the light weight of the light guide plate. Further taking the thermal dissipation issue into consideration, a heat dissipation layer can be disposed at the rear surface of the disc shape illumination shell, and the circuit and the light source are arranged on the front surface of the illumination shell. The heat dissipation layer can be formed by painting a copper thin film on the rear surface of the light guide plate.

According to an embodiment of the disclosure, the illumination apparatus further includes a connecting illumination shell to connect the illumination shell, and the light of the light source can be transitioned from the illumination shell to the connecting illumination shell. In another embodiment, a connecting circuit is provided to be integrated with the connecting illumination shell, and the connecting circuit is electrically connected to the circuit which is integrated with the illumination shell. In still another embodiment, a connecting light source is provided to be disposed on the connecting illumination shell and electrically connected to the connecting circuit. In the other embodiment, the connecting light source is formed by many color lighting elements. Further, the connecting illumination shell and said illumination shell are shaped to have concave and convex structures for connection.

BRIEF DESCRIPTION OF THE DRAWINGS

The present disclosure will be apparent to those having ordinary skill in the field by reading the following detailed description of embodiments thereof, with reference to the attached drawings, in which.

DETAILED DESCRIPTION OF THE PREFERRED EMBODIMENT

The accompanying drawings are included to provide a further understanding of the disclosure, and are incorporated in and constitute a part of this specification. The drawings illustrate embodiments of the disclosure and, together with the description, serve to explain the principles of the disclosure. The same or similar reference numbers used in the present embodiment and in the fourth embodiment represent the same or the like elements.

Figure 1:
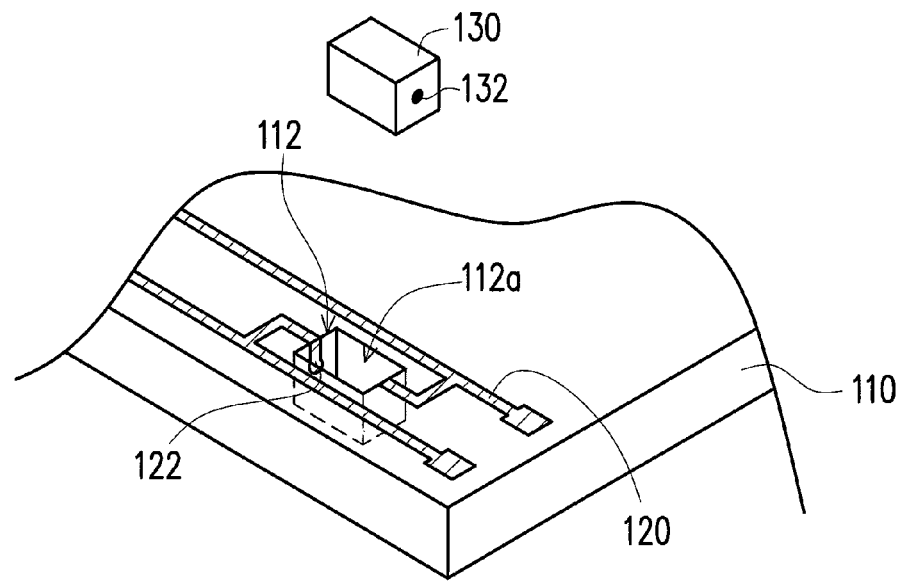
FIG. 1 is an explosive view depicting a part of an illumination apparatus according to a first embodiment of the disclosure.

FIG. 1 is an explosive view depicting a part of an illumination apparatus according to a first embodiment of the disclosure. Referring to FIG. 1, the illumination apparatus 100 of the present embodiment includes an illumination shell 110 formed by a light guide plate, a circuit 120 and a light source 130. The circuit 120 is directly integrated with the illumination shell 110 and has a plurality of circuit contacts 122. In the present embodiment, the material of the circuit 120 can be light-transmitting material, for example, indium tin oxide (ITO), etc., but the disclosure is not limited thereto. The light source 130 is disposed on the illumination shell 110 and electrically connected to the circuit contacts 122. In the present embodiment, the illumination shell 110 is in flat-plate shape, and may be mounted on, for example, the ceiling or the wall, etc., for decoration or illumination. The light source 130 can be a light-emitting diode (LED), and the light source 130 includes many light source contacts 132 for being electrically connected to the circuit contacts 122. In the present embodiment, the light source contacts 132 are, for example, contact pads, but in other embodiment, the light source contacts 132 can also be terminal type pins for being connected to the circuit contacts 122.

In the present embodiment, the illumination shell 110 has a recessed compartment 112 for receiving the light source 130, and the circuit contacts 122 are extended and arranged on the inner surface 112a of the recessed compartment 112. The recessed compartment 112 is, for example, a recess or a hole, etc., so the light source 130 can be engaged partly or all in the illumination shell 110. Therefore, the top surface of the light source 130 can be coplanar with the surface of the illumination shell 110. Of course, the present disclosure is not limited thereto. In other embodiment, the light source 130 can be directly mounted on the surface of the illumination shell 110 via circuit contacts 122 of the circuit 120 by surface mounting technology (SMT). Although the light source 130 and recessed compartment 112 are illustrated singular in the present embodiment, the number of the light source 130 and the recessed compartment 112 can be plural, and each of the recessed compartments 112 can receive one or more light source 130.

Accordingly, the circuit 120 of the illumination apparatus 100 is integrated with the illumination shell 110, so the light source 130 can be directly mounted on the illumination shell 110 by electrically connected to the circuit 120 without using a circuit board. The process of the fabrication thus can be simplified, the fabrication cost can be reduced, and the design tolerance of the shape of the illumination shell 110 can be increased due to the designated shape of the illumination shell 110 not to be limited by the flexibility of the circuit board.

The embodiments below may contain many features similar to the embodiment disclosed earlier with FIG. 1. To clarify and simplify the description, similar features may be omitted.

Figure 2:
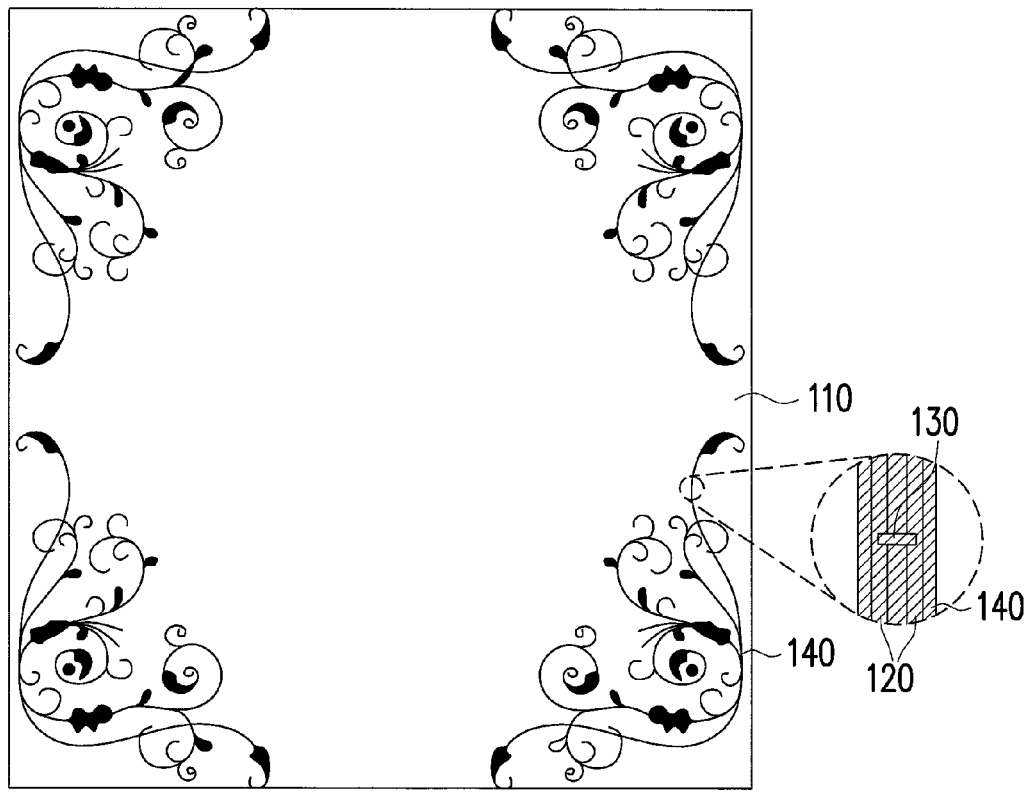
FIG. 2 is a plane view of an illumination apparatus according to a second embodiment of the disclosure.

FIG. 2 is a plane view of an illumination apparatus according to a second embodiment of the disclosure. Referring to FIG. 2, in the present embodiment, the illumination apparatus 100 may further include a decoration pattern 140 on the surface of the illumination shell 110, and the circuits 120 integrated with the illumination shell 110 are arranged on the decoration pattern 140 and overlapped therewith. Namely, the circuits 120 are hidden within the distribution range of the decoration pattern 140, and each of the circuits 120 may be electrically connected to a plurality of light sources 130 via, for example, the circuit contacts 122 and the light source contacts 132 as shown in FIG. 1. Thereby, the material of the circuits 120 may not necessarily be light-transmitting material, and may be, for example, copper, silver, etc., so as to further increase the thermal dissipation ability. However, the present disclosure is not limited thereto. In other embodiment, light-transmitting material may still be adopted as the material of the circuits 120 for aesthetic reasons.

Figure 3:
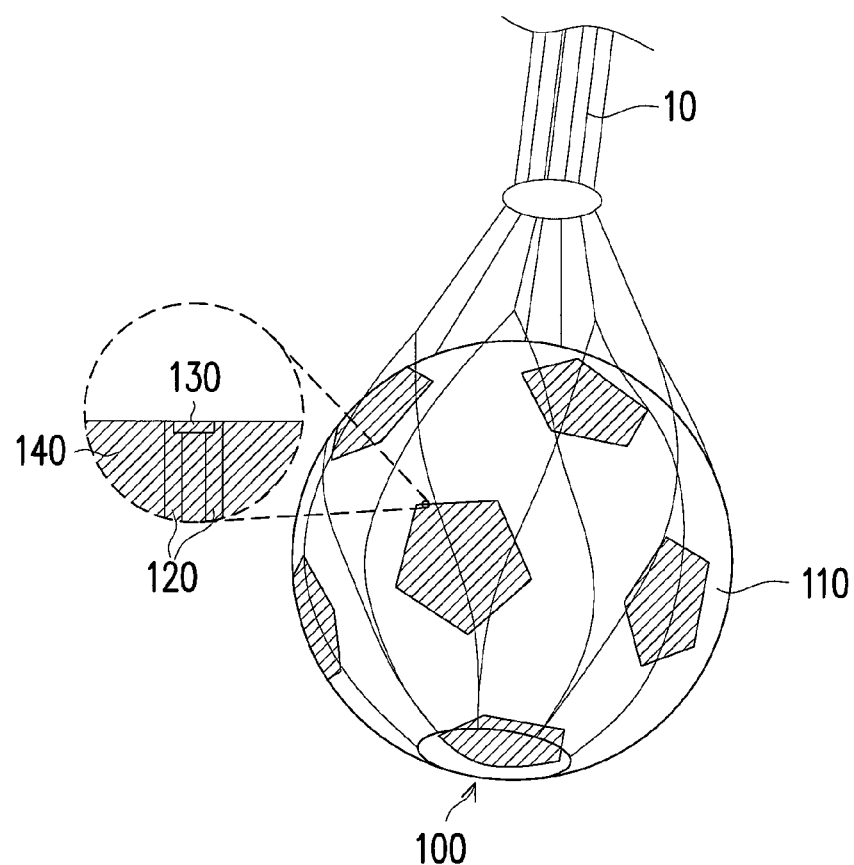
FIG. 3 is a perspective view of an illumination apparatus according to a third embodiment of the disclosure.

FIG. 3 is a perspective view of an illumination apparatus according to a third embodiment of the disclosure. Referring to FIG. 3, in the present embodiment, the illumination shell 110 is in ball shape, and the circuits 120 integrated with the illumination shell 110 are distributed over an outer surface of the ball-shaped illumination shell 110. Each of the circuits 120 may be electrically connected to a plurality of light sources 130 via, for example, the circuit contacts 122 and the light source contacts 132 as shown in FIG. 1. The illumination apparatus 100 can be further connected to a fixture 10, and the fixture 10 can connected to, for example, a ceiling, etc., for illumination or decoration purposes. Additionally, since the illumination shell 110 is formed by the light guide plate, which can be achieved by the plastic materials such as the polymethyl methacrylate (PMMA) or the polystyrene (PS), the light weight of the illumination shell 110 enables the fixture 10 to be achieved by plastic ropes, such as the nylon ropes. The illumination apparatus 100 may further include a decoration pattern 140 on a surface of the illumination shell 110 for decoration purpose. The circuits 120 integrated with the illumination shell 110 may be arranged on the decoration pattern 140 and overlapped therewith, but the present disclosure does not limit the layout of the circuits 120 or the formation of the fixture 10.

Following the thinking of the third embodiment, the material of the circuits 120 can be designed by the light-transmitting material, for example, indium tin oxide (ITO) for aesthetic reasons, and the illumination shell 110 in ball shape can be evenly illuminated without any colored decoration pattern. A lamp holder formed in a token stick shape may be applied, and the electric power is applied via the lamp holder to the circuit contacts 122. Therefore, an illumination apparatus 100 in a crystal ball shape is provided for decoration or illumination.

Figure 4:
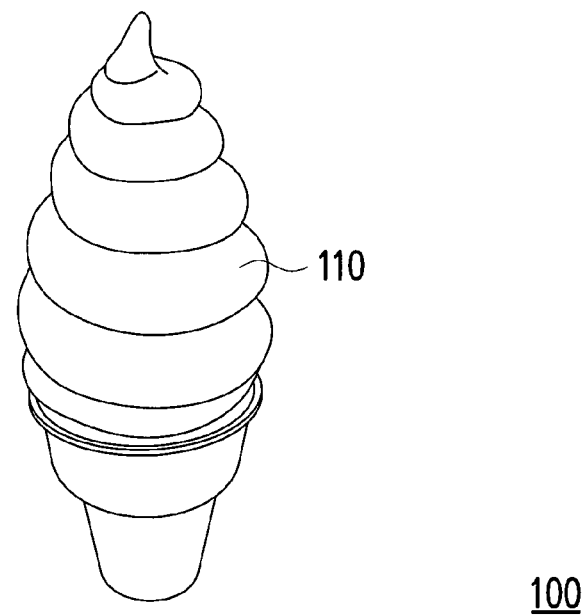
FIG. 4 is a schematic view of an illumination apparatus according to a fourth embodiment of the disclosure.

As being described above, an ice-cream shaped signboard depicted in FIG. 4 is provided as a fourth embodiment of the disclosure. The illumination shell 110 formed by the light guide plate is flexible and can be shaped into many moldings. Further, the light sources 130 can be formed by many color lighting elements and designed to match the colored decoration pattern of the illumination shell 110. For instance, the lightened ice-cream shaped signboard can be colored by the LEDs to represent many tastes, such as pink for strawberry, light green for vanilla, and brown for chocolate, in sequence.

Figure 5:
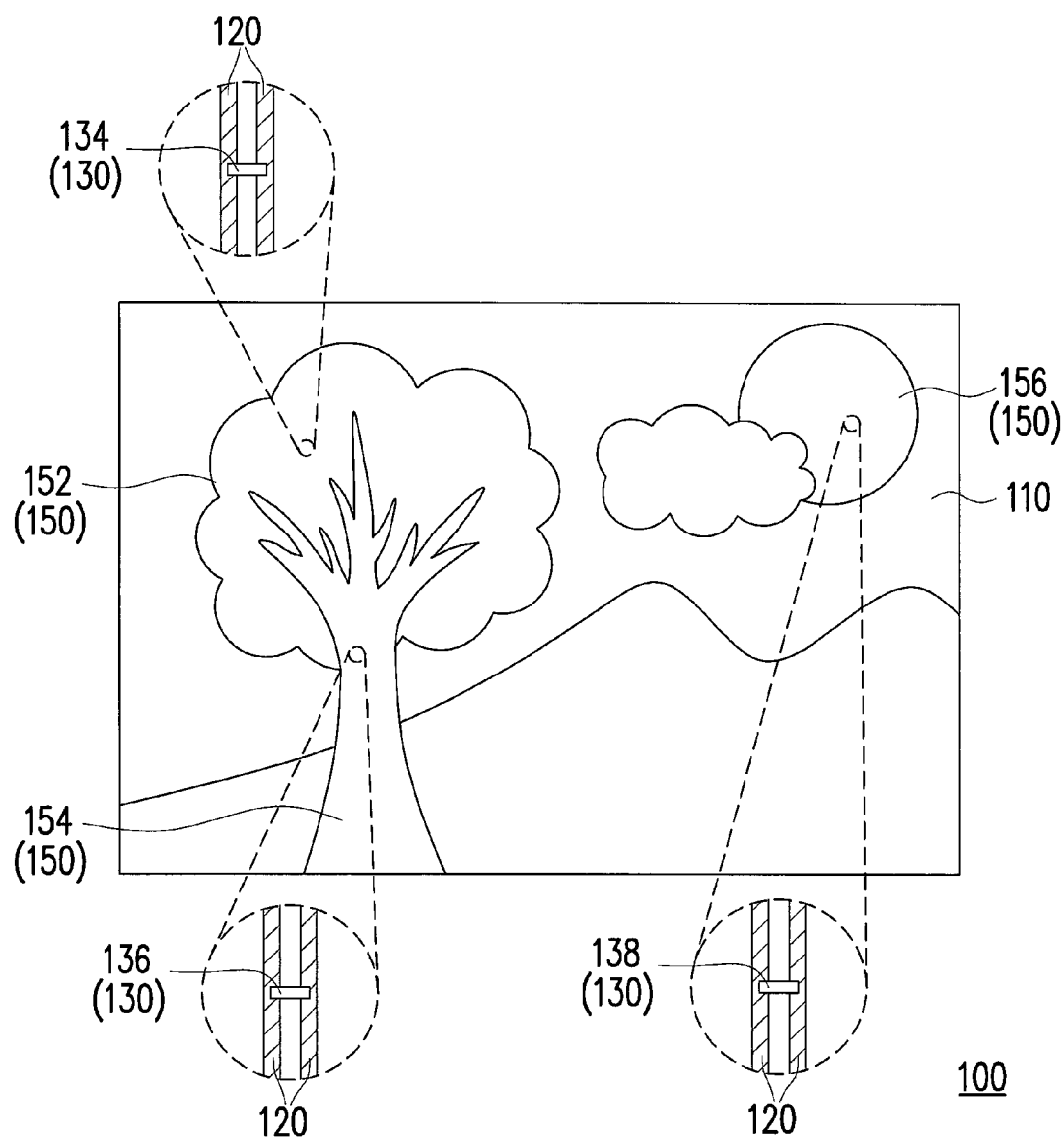
FIG. 5 is a plane view of an illumination apparatus according to a fifth embodiment of the disclosure.

FIG. 5 is a plane view of an illumination apparatus according to a fifth embodiment of the disclosure. Referring to FIG. 5, in the present embodiment, the light sources 130 of the illumination apparatus 100 in FIG. 5 may include a first color lighting element 134 and a second color lighting element 136 for providing different colors of light beams. The illumination apparatus 100 may further includes a colored decoration pattern 150 on the surface of the illumination shell 110, and the first color lighting element 134 and the second color lighting element 136 are arranged on the colored decoration pattern 150 and electrically connected to the circuits 120 integrated with the illumination shell 110. The colors of the first color lighting element 134 and the second color lighting element 136 are in accordance with the colors of the colored decoration pattern 150. For example, as being depicted in FIG. 5, the color of the first color lighting element 134 arranged on the leaf pattern 152 of the colored decoration pattern 150 is in accordance with the color of the leaf pattern 152, which may be green. The color of the second color lighting element 136 arranged on the trunk pattern 154 of the colored decoration pattern 150 is in accordance with the color of the trunk pattern 154, which may be brown. A third color lighting element 138 may be arranged on the sun/moon pattern 156 of the colored decoration pattern 150. Additionally, the color lighting elements can be made by several dies packaged together for providing different color beams based on a designed controlling signal. Therefore, the colors of the first color lighting element 134, the second color lighting element 136 and the third color lighting element 138 may change according to different environmental factors. To be more specific, the color of the first color lighting element 134 arranged on the leaf pattern 152 may change according to the time or the seasons, for example, the color of the first color lighting element 134 may change to yellow in autumn. Similarly, the third color lighting element 138 arranged on the circuit 120 may be bright white to represent the sun in daytime, red for sunset and light yellow for the moon.

Figure 6A:
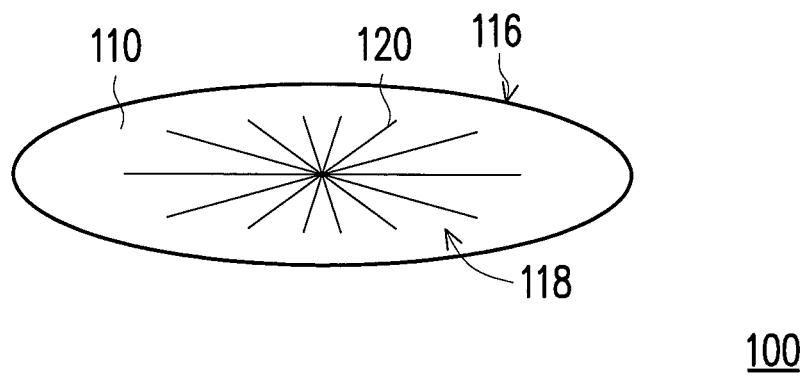
FIGS. 6A and 6B are perspective views of an illumination apparatus according to a sixth embodiment of the disclosure.
Figure 6B:
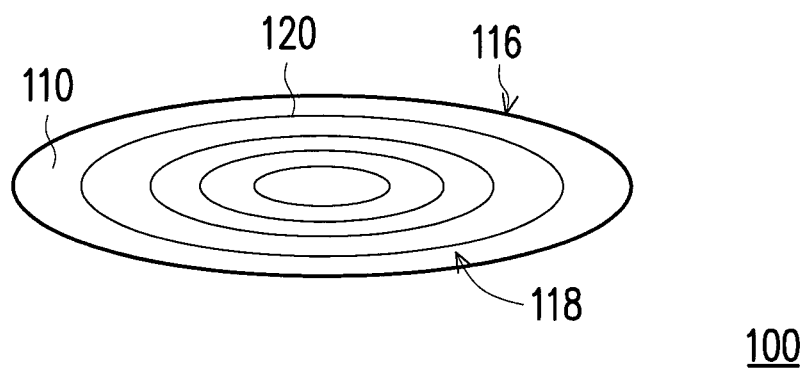

FIGS. 6A and 6B are perspective views of the illumination apparatuses according to the sixth embodiment of the disclosure. Referring to FIG. 6A, the illumination shell 110 is in disc shape, and is adapted to be connected to a fixture, and the illumination apparatus 100 may be fixed to, for example, a ceiling, etc., via the fixture for decoration or illumination purpose. For instance, the illumination apparatus 100 is a ceiling round light. The circuits 120 integrated with the illumination shell 110 are distributed over the front surface 118 of the disc-shaped illumination shell 110, and the fixture is connected to the rear surface 116 of the disc-shaped illumination shell 110. What is worth to be mentioned is that the fixture can also be designed as a net to hold the disc-shaped illumination shell 110. In the present embodiment, the circuits 120 are arranged to form a pattern having many radial lines extend from the center to the edge of the front surface of the disc-shaped illumination shell 110 in FIG. 6A, and the circuits 120 are arranged to form many concentric circles in FIG. 6B. The material of the circuits 120 is light-transmitting material, for example, indium tin oxide (ITO) for aesthetic reasons, and the illumination apparatus 100 in disc shape can be evenly illuminated.

Figure 7:
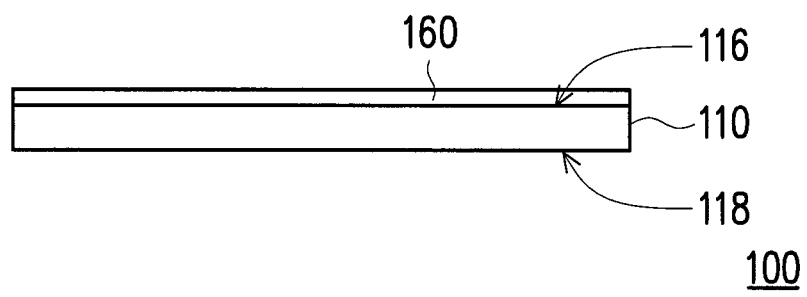
FIG. 7 is a side view of an illumination apparatus according to a seventh embodiment of the disclosure.

FIG. 7 is a side view of an illumination apparatus according to a seventh embodiment of the disclosure. Referring to FIG. 7, the illumination apparatus 100 depicted in FIG. 6 may further include a heat dissipation layer 160 disposed at the rear surface 116 of the illumination shell 110 for dissipating the heat generated by the light sources 130 of the illumination apparatus 100, so the illumination apparatus 100 can have better heat dissipating efficiency. The heat dissipation layer 160 can be achieved by painting a copper thin film on the rear surface 116 of the light guide plate. The circuits 120 integrated with the illumination shell 110 are distributed over the front surface 118 of the disc-shaped illumination shell 110.

Figure 8:
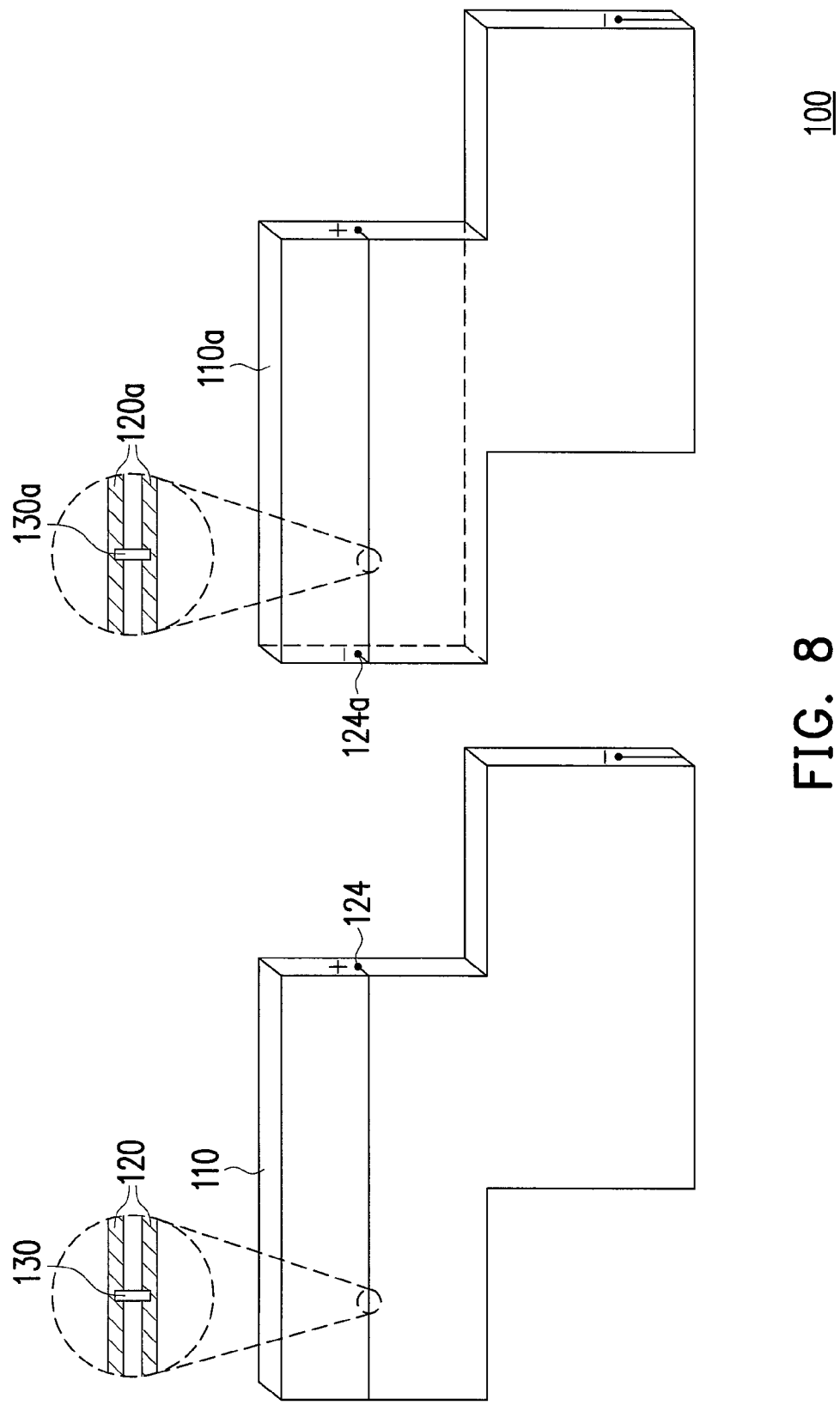
FIG. 8 is a schematic view of an illumination apparatus according to an eighth embodiment of the disclosure.

FIG. 8 is a schematic view of an illumination apparatus according to an eighth embodiment of the disclosure. Referring to FIG. 8, the illumination apparatus 100 may further include a connecting illumination shell 110a formed by a light guide plate, a connecting circuit 120a and a connecting light source 130a. The connecting light source 130a is disposed on the connecting illumination shell 110a and electrically connected to the connecting circuit 120a, wherein the connecting circuit 120a is integrated with the connecting illumination shell 110a. The illumination shell 110 is adapted to be connected to the connecting illumination shell 110a for illumination or decoration in great area. The circuit 120 has a connecting terminal 124 located at the edge of the illumination shell 110, and the connecting circuit 120a has a second connecting terminal 124a corresponding to the first connecting terminal 124 and located at the edge of the connecting illumination shell 110a. Thereby, when the illumination shell 110 is connected to the connecting illumination shell 110a, the first connecting terminal 124 is connected to the second connecting terminal 124a for electrically connecting the illumination shell 110 and the connecting illumination shell 110a. In addition, the connecting illumination shell 110a and the illumination shell 110 are shaped to have concave and convex structures corresponding to each other, so the connecting illumination shell 110a and the illumination shell 110 to tightly engage with each other for better connection. Of course, the present disclosure does not limit the number of the connecting illumination shell 110a, and the layout of the circuit 120 and the connecting circuit 120a, as long as the illumination shell 110 and all the connecting illumination shells are electrically connected to each other continuously so as to provide great area of illumination or decoration.

In other embodiment, the connecting illumination shell 110a may be connected to the illumination shell 110 without the connecting circuit 120a integrated thereon, and the light source 130 may be disposed at the side surface of the illumination shell 110, so the light of the light source 130 can be transmitted from the illumination shell 110 to the connecting illumination shell 110a since the illumination shell 110 and the connecting illumination shell 110a are both formed by light guide plates. In other embodiment, the connecting circuit 120a may be integrated on the connecting illumination shell 110a, so the connecting illumination shell 110a is electrically connected to the illumination shell 110. Of course, the present disclosure does not limit the number of the connecting illumination shells 110a. The illumination shell 110 and many connecting illumination shells 110a may be sequentially connected to each other, and only one of the illumination shells 110 and 110a needs to be connected to an external power for the illumination shell 110 and the connecting illumination shells 110a to be electrically connected to each other. Accordingly, the connecting light sources 120a may be connected to the connecting circuits 120*a* optionally to provide great area of illumination or decoration. Furthermore, the connecting light source 120*a* may be composed of a first color lighting element and a second color lighting element for showing different colors according to actual demand of the design.

Based on the above-mentioned description, the circuit of the illumination apparatus in the present disclosure is integrated with the illumination shell, so the light source can be directly mounted on the illumination shell by electrically connected to the circuit without firstly being mounted to a circuit board. Therefore, the fabrication process of the illumination apparatus in the disclosure can be simplified, and the fabrication cost of illumination apparatus in the disclosure can also be reduced.

Although the disclosure has been described with reference to the embodiments thereof, it is apparent to those skilled in the art that a variety of modifications and changes may be made without departing from the scope of the disclosure which is intended to be defined by the appended claims.

What is claimed is:

1. An illumination apparatus comprising:
    an illumination shell formed by a light guide plate;
    a circuit having a plurality of circuit contacts integrated with said light guide plate; and
    a light source disposed on said light guide plate and electrically contacted to said plurality of circuit contacts, said light source is formed by a first color lighting element and a second color lighting element; and
    a colored decoration pattern formed on the surface of said illumination shell, said first color lighting element and said second color lighting element are arranged on said colored decoration pattern, and the colors of said first color lighting element and said second color lighting element are in accordance with the colors of said colored decoration pattern.

2. The illumination apparatus of claim 1, further comprising a hard coating layer disposed to cover said circuit.

3. The illumination apparatus of claim 1, wherein the material of said circuit is a light-transmitting material.

4. The light guide apparatus of claim 1, further comprising a recessed compartment disposed on said light guide plate for receiving said light source.

5. The illumination apparatus of claim 4, wherein said recessed compartment is a recess.

6. The illumination apparatus of claim 4, wherein said recessed compartment is a hole.

7. The illumination apparatus of claim 4, wherein said plurality of circuit contacts are extended and arranged on the inner surface of said recessed compartment.

8. The illumination apparatus of claim 1, wherein said circuit is arranged on and overlapped with said decoration pattern.

9. The illumination apparatus of claim 1, wherein said illumination shell is in ball shape.

10. The illumination apparatus of claim 9, wherein said circuit is arranged on the outer surface of said illumination shell.

11. The illumination apparatus of claim 1, wherein said illumination shell is in disc shape and adapted to be connected to a fixture.

12. The illumination apparatus of claim 1, further comprising a connecting illumination shell for connecting said illumination shell, and the light of said light source transitioned from said illumination shell to said connecting illumination shell.

13. The illumination apparatus of claim 12, further comprising a connecting circuit integrated with said connecting illumination shell for electrically connecting said circuit.

14. The illumination apparatus of claim 13, further comprising a connecting light source disposed on said connecting illumination shell and electrically connected to said connecting circuit.

15. The illumination apparatus of claim 14, wherein said connecting light source is formed by a first color lighting element and a second color lighting element.

16. The illumination apparatus of claim 12, wherein said connecting illumination shell and said illumination shell are shaped to have concave and convex structures for connection.

* * * * *